(12) United States Patent
Schnelle et al.

(10) Patent No.: US 7,363,310 B2
(45) Date of Patent: Apr. 22, 2008

(54) MAPPING OF DATA FROM XML TO SQL

(75) Inventors: Christoph Schnelle, Burringbar (AU); Geoffrey John Nolan, Lane Cove (AU)

(73) Assignee: TimeBase Pty Limited, Sydney, New South Wales (AU)

( * ) Notice: Subject to any disclaimer, the term of this patent is extended or adjusted under 35 U.S.C. 154(b) by 308 days.

(21) Appl. No.: 10/233,991

(22) Filed: Sep. 3, 2002

(65) Prior Publication Data

US 2003/0070144 A1    Apr. 10, 2003

Related U.S. Application Data

(60) Provisional application No. 60/317,038, filed on Sep. 4, 2001.

(51) Int. Cl.
*G06F 17/00* (2006.01)
*G06F 7/00* (2006.01)
(52) U.S. Cl. .................. 707/102; 707/2; 715/523; 715/513
(58) Field of Classification Search ........... 715/513, 715/523, 531; 707/102, 2
See application file for complete search history.

(56) References Cited

U.S. PATENT DOCUMENTS

| | | | |
|---|---|---|---|
| 4,558,413 A | 12/1985 | Schmidt et al. | |
| 4,627,019 A | 12/1986 | Ng | |
| 4,714,992 A | 12/1987 | Gladney et al. | |
| 4,853,843 A | 8/1989 | Ecklund | |
| 4,875,159 A | 10/1989 | Cary et al. | |
| 5,287,496 A | 2/1994 | Chen et al. | |
| 5,355,472 A * | 10/1994 | Lewis | 707/101 |
| 5,732,257 A * | 3/1998 | Atkinson et al. | 707/4 |
| 5,740,425 A | 4/1998 | Povilus | |

(Continued)

FOREIGN PATENT DOCUMENTS

WO    97/15890    5/1997

(Continued)

OTHER PUBLICATIONS

Morrison, Michael, et al., XML Unleashed, Sam's Publishing, Indianapolis, IN, Dec. 1999, pp. 398-415, 482-489, 506-507 and 518-519.*

(Continued)

*Primary Examiner*—Shahid Alam
*Assistant Examiner*—Robert Stevens
(74) *Attorney, Agent, or Firm*—Jones Day

(57) ABSTRACT

A method, an apparatus and a computer program product for converting an XML encoded dataset into a minimal set of SQL tables are provided. In the method, a hierarchical structure in the XML encoded dataset is identified. A node element set for the XML encoded dataset is determined, wherein each node element in the node element set is a discrete level of the hierarchical structure of the dataset. One or more nodes of the XML encoded dataset are determined, each node being an instance of a node element. A unique node identifier is allocated to each node. Then, an SQL node table containing one or more records is generated, each record corresponding to a respective one of the allocated node identifiers. An SQL ancestry table is optionally generated to define the inter-relationships among nodes of the identified hierarchical structure of the XML encoded dataset.

39 Claims, 4 Drawing Sheets

U.S. PATENT DOCUMENTS

| | | | |
|---|---|---|---|
| 5,835,087 A | 11/1998 | Herz et al. | |
| 5,892,513 A | 4/1999 | Fay | |
| 5,935,210 A | 8/1999 | Stark | |
| 5,963,208 A | 10/1999 | Dolan et al. | |
| 6,026,388 A | 2/2000 | Liddy et al. | |
| 6,144,962 A | 11/2000 | Weinberg et al. | |
| 6,185,576 B1 | 2/2001 | McIntosh | |
| 6,189,019 B1 | 2/2001 | Blumer et al. | |
| 6,233,592 B1 | 5/2001 | Schnelle et al. | |
| 6,421,656 B1* | 7/2002 | Cheng et al. | 707/2 |
| 6,502,101 B1* | 12/2002 | Verprauskus et al. | 707/101 |
| 6,529,905 B1 | 3/2003 | Bray et al. | |
| 6,542,911 B2* | 4/2003 | Chakraborty et al. | 707/206 |
| 6,581,062 B1* | 6/2003 | Draper et al. | 707/100 |
| 6,584,459 B1* | 6/2003 | Chang et al. | 707/3 |
| 6,584,480 B1 | 6/2003 | Ferrel et al. | |
| 6,601,065 B1* | 7/2003 | Nelson et al. | 707/4 |
| 6,606,653 B1 | 8/2003 | Ackermann et al. | |
| 6,636,845 B2* | 10/2003 | Chau et al. | 707/1 |
| 6,643,633 B2* | 11/2003 | Chau et al. | 707/1 |
| 6,708,186 B1* | 3/2004 | Claborn et al. | 707/102 |
| 6,721,727 B2* | 4/2004 | Chau et al. | 707/3 |
| 6,772,139 B1 | 8/2004 | Smith, III | |
| 6,823,495 B1* | 11/2004 | Vedula et al. | 715/805 |
| 6,826,726 B2* | 11/2004 | Hsing et al. | 715/513 |
| 6,832,219 B2 | 12/2004 | Lal | |
| 6,836,778 B2* | 12/2004 | Manikutty et al. | 707/102 |
| 6,853,997 B2* | 2/2005 | Wotring et al. | 707/100 |
| 6,886,005 B2 | 4/2005 | Davis | |
| 6,944,817 B1 | 9/2005 | Danneels | |
| 6,947,945 B1 | 9/2005 | Carey et al. | |
| 7,075,536 B1 | 7/2006 | Goldschmidt | |
| 2001/0047372 A1* | 11/2001 | Gorelik et al. | 707/514 |
| 2002/0010700 A1* | 1/2002 | Wotring et al. | 707/100 |
| 2002/0010711 A1 | 1/2002 | Nakanishi et al. | |
| 2002/0023091 A1* | 2/2002 | Silberberg et al. | 707/103 Y |
| 2002/0116371 A1* | 8/2002 | Dodds et al. | 707/3 |
| 2002/0120630 A1* | 8/2002 | Christianson et al. | 707/103 R |
| 2002/0129052 A1* | 9/2002 | Glazer et al. | 707/501.1 |
| 2002/0133484 A1 | 9/2002 | Chau et al. | |
| 2002/0133497 A1* | 9/2002 | Draper et al. | 707/100 |
| 2002/0156811 A1* | 10/2002 | Krupa | 707/513 |
| 2002/0169788 A1* | 11/2002 | Lee et al. | 707/104.1 |
| 2002/0194357 A1* | 12/2002 | Harris et al. | 709/232 |
| 2003/0023754 A1 | 1/2003 | Eichstadt et al. | |
| 2003/0041305 A1 | 2/2003 | Schnelle et al. | |
| 2003/0140308 A1 | 7/2003 | Murthy et al. | |
| 2003/0167456 A1* | 9/2003 | Sabharwal | 717/108 |
| 2003/0177443 A1 | 9/2003 | Schnelle et al. | |
| 2003/0226108 A1 | 12/2003 | Oezgen | |
| 2004/0139327 A1 | 7/2004 | Brown et al. | |
| 2004/0183831 A1 | 9/2004 | Ritchy et al. | |
| 2004/0220927 A1 | 11/2004 | Murthy et al. | |
| 2005/0278475 A1 | 12/2005 | Karatal et al. | |
| 2006/0181531 A1 | 8/2006 | Goldschmidt | |
| 2007/0192246 A1 | 8/2007 | Futamase | |

FOREIGN PATENT DOCUMENTS

| | | |
|---|---|---|
| WO | 98/34179 | 8/1998 |

OTHER PUBLICATIONS

"DB2 Universal database XML Extender: Web-Enabling Your Data with XML", IBM product information sheet, © 2000, 2 pages.*

Baru, Chaitanya, "Xviews: XML Views of Relational Schemas", San Diego Supercomputer Center Techniocal Report, SDSC TR-199-3, Oct. 1999, 18 pages.*

Sturm, Jake, Developing XML Solutions, Microsoft Press, Redmond, WA, © 2000, pp. 287-289, 347-348 and 359-366.*

Harold, Elliotte Rusty, XML: Extensible Markup Language, IDG Books Worldwide, Inc., Foster City, CA, © 1998, pp. 32-39, 57-59, 66-70 and 96-99.*

Dayen, Igor, "Storing XML in Relational Databases", XML.com, www.xml.com/lpt/a/803, Jun. 20, 2001, pp. 1-13.*

Wang, Wen Qiang, et al., "XstorM: A Scalable Storage Mapping Scheme for XML Data", World Wide Web, vol. 4 Nos. 1-2, Mar. 2001, pp. 101-119.*

Zhu, Yan, et al., "Data Transformation for Warehousing Web Data", WECWIS 2001, Jun. 21-22, 2001, pp. 74-85.*

Harold, Elliotte Rusty, XML: Extesible Markup Lnguage, IDG Boks Worldwide. Inc., Foster City 1998, pp. 32-39, 57-59, 66-70 and 96-99.

DeRose, W3C: XML Linking Language Xlink, Dec. 20, 2000, W3C, Version 1.0, pp. 1-27.

Arnold-Moore, Timothy and Sacks-Davis, Ron; Databases of Legislation: the Problems of Consolidations, Collaborative Information Technology Research Institute, May 15, 1994.

Freeman, Simon and Callum, Euan; A Brief History of Time Travel; Legal Information Management 4 (2004) pp. 28-30.

Lim et al., "An Automated Approach for Retrieving Hierarchical Data from HTML Tables", CIKM '99, Nov. 1999, Kansas City, MO, USA, pp. 466-474.

Eisenberg et al., "SQL/XML is Making Good Progress", SIGMOD Record, vol. 31, No. 2, Jun. 2002, pp. 101-108.

Promenschenkel, "STEPS: toward a new era in electronic publishing", OCLC Newsletter, Jul./Aug. 1995, No. 216, found at website: http://digitalarchive.oclc.org/da/ViewObjectMain.jsp;jsessionid= 84ae0c5fi82409328f8d87a14475bd40eaaceff43afd?fileid= 0000001695:000000042504&reqi.

Kim et al., "OOHS: An Object-Oriented Hypermedia System", COMPSAC, Seoul, KR, Aug. 21, 1996-Aug. 23, 1996, pp. 496-501, IEEE, XP 000684382, IEEE Comp. Soc. Los Alamitos, CA US ISBN: 0-8186-7579-9.

Arnold-Moore et al., "The ELF data model and SGQL query language for structured document databases", Sixth Australasian Database Conf., ADC'95, Adelaide, AU, [Online] vol. 17, No. 2, Jan. 30, 1995-Jan. 31, 1995, pp. 17-26, XP002204886, Australian Computer Science Communications ISSN: 0157-3055 Retrieved from the Internet: URL:http://www.mds.rmit.edu.au/~tja/papers/index.html>.

P. Francois, "Generalized SGML repositories: Requirements and modeling", Computer Standards and Interfaces, vol. 18, No. 1, 1996, pp. 11-24, XP004006104, Elsevier Sequoia, Lausanne, CH ISSN: 0920-5489.

WR Communication pursuant to Article 115(c) EPC, Nov. 30, 2006.
http://www.sweetandmaxwell.co.uk/westlaw/pdfs/user_guide.pdf, 2006.
http://www.sweetandmaxwell.co.uk/about/history.html, 2003.
http://www.complinet.com/home/about, 2006.
http://www.sweetandmaxwell.co.uk/westlaw/about.htm, 2006.
http://www.butterworths.com/about/index.htm, 2000.
http://www.complinet.com/home/share/pdf/news_rules/uk/companylaw_NR_insert.pdf, 2006.
http://www.complinet.com/home/news_rules/, 2006.
http://www.pendragon.co.uk/perspective, 2001.
http://www.pendragon.co.uk/perspective/perspective2.htm, 2001.
http://www.pendragon.co.uk/perspective/perspective3.htm, 2001.

Search Report of Corresponding European Appl. No. 98 901 249.7-1527, Jan. 28, 2005.

Communication pursuant to Article 115(c) and responsive to "WR Communication pursuant to Article 115(c) EPC, Nov. 30, 2006" EPC, Jan. 26, 2007.

Arnold-Moore et al. "Models for Structured Document Database Systems", Royal Melbourne Institute of Technology, 1998.

Arnold-Moore, "Automatic Generation of Amendment Legislation", ACM 1997.

Arnold-Moore et al. "Connected to the Law: Tasmanian Legislation Using EnAct", InQuirion Pty Ltd., 2002.

Sacks-Davis et al. "Database Systems for Structured Documents", International Symposium on Advanced Database Technologies and Their Integration, Japan, 2002.

Sacks-Davis et al., "A Standards-Based Approach to Combining Information Retrieval and Database Functionality", International Journal of information Technology, 1(1):1-15, 1995.

Arnold-Moore, "Automatically, Processing Amendments to Legislation", ACM 1995.

Jan. 18, 2007 letter enclosing website entitled "The Information Society Creative Awards 1996", available at: http://met.open.ac.uk/isca/, 1996.

ActiveTEXT Datasheet, available at: http://web.archive.org/web/19970630042435/www.ais.co.uk/atds.html, 1997.

Jan. 19, 2007 letter in response to Jan. 18, 2007 letter enclosing website entitled "The Information Society Creative Awards 1996", available at: http://met.open.ac.uk/isca/, 1996.

Office Action of Corresponding European Appl. No. 98 901 249.7-1527, Jan. 25, 2007.

Maioli C. et al., "Versioning Issues in a Collaborative Distributed Hypertext System" Technical Report Universita Di Bologna, Apr. 1993.

Reexamination Request from US Patent No. 6,233,592; Jan. 29, 2007.

Order Granting Reexamination Request from US Patent No. 6,233,592, Apr. 3, 2007.

*TimeBase Pty Ltd* v. *The Thompson Corp.*, U.S. District Court for the Northern District of Illinois, Complaint filed Jan. 24, 2007.

Eckhert, "Processing Hypertext Links after Xlink", 2004, pp. 1-58.

McFall et al. "Automatically Finding and Repairing Broken Lings Between XML Documents" Dec. 1998, Department of Computer Science, Michigan State University, pp. 1-18.

Davis, "Hypertext Link Integrity", Dec. 1999, pp. 1-6.

Ducharme, "Links that are More Valuable than the Information they Link", Jul. 25, 1998, xml.com, pp. 1-3.

Lowe et al. "Improving Web Linking Using Xlink", Jul. 2001, pp. 1-19.

Simpson, "Top Ten Tips to Using Xpath and Xpointer", Aug. 21, 2002, xml.com, pp. 1-12.

Duhig, "Separating Links Content using XML, Xlink and Xpointer", May 2001, Internationales Congress Centrum (ICC), pp. 1-19.

Maler, "XML and Broken Links (How can the XML Pointer Language, Xlink and Xpointer help solve the problem of Broken Links of the Net?", Mar. 1998 p. 1.

Fong et al. "Converting Relational Databases into XML Document", IEEE 2001, pp. 61-65.

Nambiar et al., "Current Approaches to XML Management", IEEE 2002, pp. 43-51.

Khan et al., "A performance Evaluation of Storing XML Data in Relational Database Management Systems", ACM 2001, pp. 31-38.

Shanmugasundaram et al., "Efficiently Publishing Relational Data as XML Documents", Google Apr. 2001, pp. 133-154.

Web page printout of URL http:..www.xml.com/pub/a/2001/06/20/databases.html, Jun. 2001.

Azaria, "SGML: A Lifesaver in a Sea of Electronic Documents," *Network World*, 11/50, Dec. 12, 1994, 67.

Legal Database Program entitled STATUS Utilizing Folio Bound Views, pub. 1994.

Print out of web page at URL: http://www.xml.com/pub/a/2001/06/20/databases.html, Jun. 2001.

\* cited by examiner

Figure 1 — Sample XML Document Fragment

```xml
<chapter shortref="Ch 3">
    <label>3</label>
    <desc sdate="1996-07-15">Directors' Responsibilities</desc>

<part shortref="Ch 3, Pt A">
        <label>A</label>
        <desc sdate="1996-07-15">Common Law</desc>

<section shortref="s 56">
            <label>56</label>
            <p> ... </p>

<note>
                <p> ... </p>
            </note>
        </section>

<section shortref="s 56A">
            <label>56A</label>
            <p> ... </p>
        </section>

<note>
            <p> ... </p>
        </note>
    </part>

<part shortref="Ch 3, Pt B">
        <label>B</label>
        <desc sdate="1996-07-15" edate="2001-03-22">
            Corporate Governance Act</desc>
        <desc sdate="2001-03-23">
            Corporate Governance and Disclosure Act</desc>

<section shortref="s 57">
            <label>57</label>
            <p> ... </p>
        </section>

</part>

</chapter>
```

Figure 2 — SQL Node Table
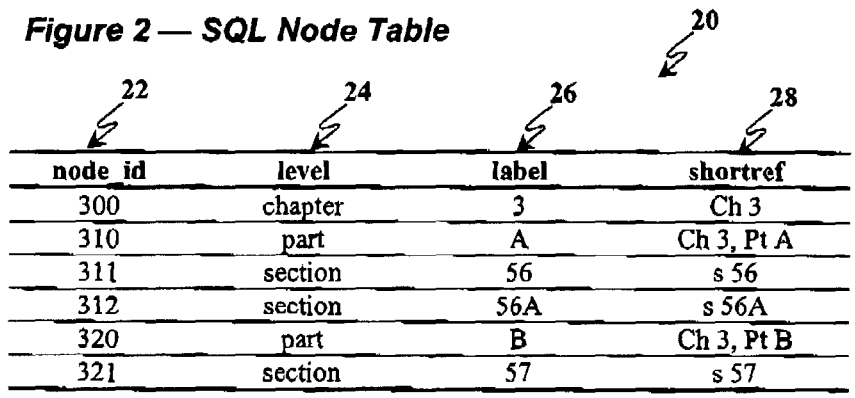
| node_id | level | label | shortref |
|---|---|---|---|
| 300 | chapter | 3 | Ch 3 |
| 310 | part | A | Ch 3, Pt A |
| 311 | section | 56 | s 56 |
| 312 | section | 56A | s 56A |
| 320 | part | B | Ch 3, Pt B |
| 321 | section | 57 | s 57 |
Figure 3 — SQL Content Table
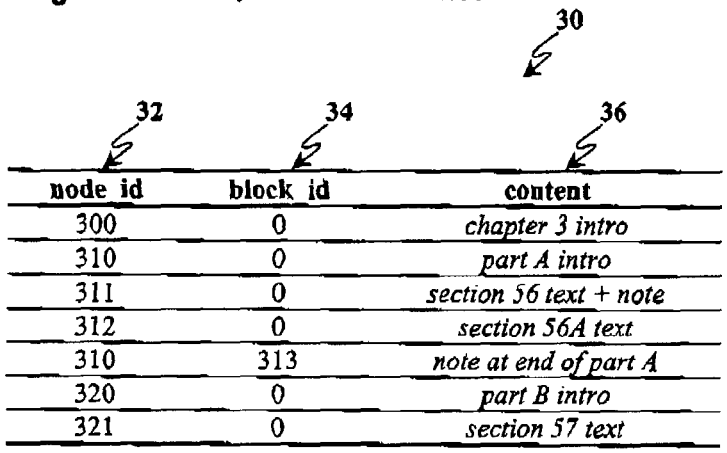
| node_id | block_id | content |
|---|---|---|
| 300 | 0 | chapter 3 intro |
| 310 | 0 | part A intro |
| 311 | 0 | section 56 text + note |
| 312 | 0 | section 56A text |
| 310 | 313 | note at end of part A |
| 320 | 0 | part B intro |
| 321 | 0 | section 57 text |

Figure 4 — SQL Ancestry Table
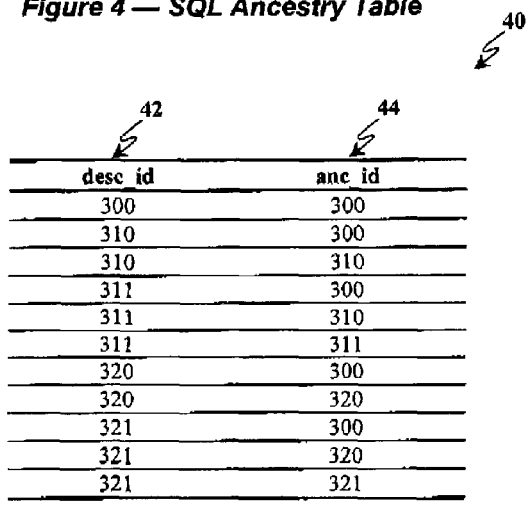
| desc_id | anc_id |
|---|---|
| 300 | 300 |
| 310 | 300 |
| 310 | 310 |
| 311 | 300 |
| 311 | 310 |
| 311 | 311 |
| 320 | 300 |
| 320 | 320 |
| 321 | 300 |
| 321 | 320 |
| 321 | 321 |
Figure 5 — Complex Property: Major Titles
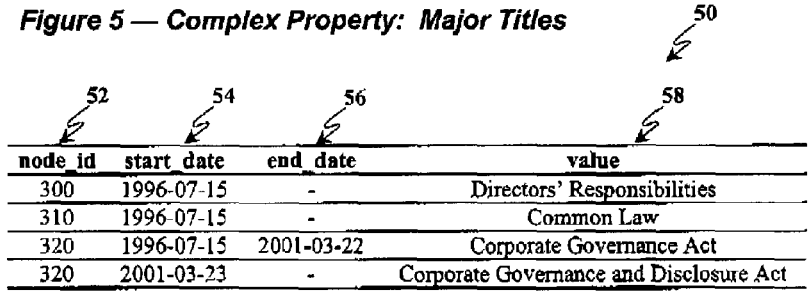
| node_id | start_date | end_date | value |
|---|---|---|---|
| 300 | 1996-07-15 | - | Directors' Responsibilities |
| 310 | 1996-07-15 | - | Common Law |
| 320 | 1996-07-15 | 2001-03-22 | Corporate Governance Act |
| 320 | 2001-03-23 | - | Corporate Governance and Disclosure Act |

MAPPING OF DATA FROM XML TO SQL

This application claims the benefit of co-pending U.S. Provisional Application Ser. No. 60/317,038 filed Sep. 4, 2001.

TECHNICAL FIELD OF THE INVENTION

The present invention relates generally to electronic documents and, in particular, to the storage, maintenance and publication of complex text-based datasets.

BACKGROUND

International Publication No. WO 98/34179 (PCT/AU98/00050) in the name of Time Base Pty Ltd and published on 6 Aug. 1998 and counterpart U.S. Pat. No. 6,233,592 issued on 15 May 2001 to Schnelle et al. are incorporated herein by cross reference. In these documents, an electronic publishing system is disclosed that provides a sparse multidimensional matrix of data using a set of flat file records. In particular, the computer-implemented system publishes an electronic publication using text-based data. Predefined portions of the text-based data are stored and used for the publication. At least one of the predefined portions is modified, and the modified version is stored as well. The predefined portion is typically a block of text, greater in size than a single word, but less than an entire document. Thus, for example, in the case of legislation, the predefined portion may be a section of the Act. Each predefined portion and the modified portion(s) are marked up with one or more links using a markup language, preferably SGML or XML, The system also has attributes, each being a point on an axis of a multidimensional space for organising the predefined portions and the modified portion(s) of the text-based data. This system is simply referred to as the Multi Access Layer Technology or "MALT" system hereinafter.

Australian Patent Application No. 65470/00 filed on 12 Oct., 2000 in the name of TimeBase Pty Ltd, Canadian Patent Application No. 2323245 filed on 12 Oct., 2000 in the name of TimeBase Pty Ltd, New Zealand Patent Application No. 507510 filed on 12 Oct., 2000 in the name of TimeBase Pty Ltd and U.S. patent application Ser. No. 09/689927 filed on 12 Oct., 2000 in the names of Lessing et al. are incorporated herein by cross reference.

U.S. patent application entitled "Resilient Data Links" filed on 18 Jul., 2001 in the names of Schnelle and Nolan is also incorporated herein by cross reference. In this document, a method, an apparatus and a computer program product for providing one or more resilient links in an electronic document are described. The methodology disclosed is referred to as "MALTlink" hereinafter.

Large or complex text-based datasets are typically hierarchical in nature. In the storage, maintenance and publication of such data, it is common to use a markup language capable of describing such hierarchies. XML is one such markup language that is more commonly used, particularly in the print, electronic or online publishing industries, and for government or public records or technical documentation. XML data is stored typically either in "flat" text files encoded in ASCII, Unicode, or other standard text encoding, or in a "native" XML database.

The flat text files may be part of a document management system. Such a document management system may be based on a relational database. Document management systems deal with a document as a whole and are able to store relevant data about each document. However, document management systems are typically not designed to operate on data (XML elements) within such documents. Consequently, a document management system does not typically operate on all (or even a substantial number of the) XML elements contained in flat text files on which the document managing system is operating. An XML database, in contrast, operates on all XML elements of the XML data that the XML database is storing and, consequently, XML databases must manage large amounts of data and detail. As a result, document management systems have a limited usefulness resulting from a lack of precision and XML databases are overwhelmed by the multiplicity of XML elements that are to be managed.

Attempts have been made to transform XML data into a set of SQL relational database tables. SQL is a database technology that provides a user with powerful query functionality and powerful data management tools. SQL possesses the stability of a mature technology, whereas XML databases are still a relatively immature technology, and thus possess a degree of instability. SQL is a fast and efficient technology, and a wide choice of software and hardware manufacturers offer or support SQL databases.

Tree mapping techniques are typically used to convert XML data into relational databases. Conventional tree mapping techniques, however, often attempt to capture all of the document hierarchy. This is almost never necessary and can result in substantial size and performance penalties in the resulting SQL tables. Such tree mapping techniques typically result in a far larger number of SQL tables than is necessary.

As an example, consider the XML fragment shown in FIG. 1. A classical approach to conversion is to represent the element tree with one table per element type, possibly with an added table to store the tree structure. A correct, and possibly even reversible, outcome results. However, the performance and management advantages (which prompted the conversion in the first place) can be diminished or even lost entirely, because of the size and complexity of the resulting tables.

Thus, a need exists for providing an efficient method for converting an XML document to a set of SQL tables.

According to a first aspect of the invention, there is provided a computer implemented method for converting an XML encoded dataset into a minimal set of SQL tables including the steps of:

identifying at least one hierarchical structure in said XML encoded dataset; and converting an XML encoded dataset associated with each identified hierarchical structure, wherein for each identified hierarchical structure said converting step includes the further steps of:

determining a node element set for said identified hierarchical structure of said XML encoded dataset, wherein each node element in said node element set is a discrete level of said identified hierarchical structure of said dataset;

determining one or more nodes of said XML encoded dataset each node being an instance of a node element;

allocating to each node a unique node identifier; and generating an SQL node table containing one or more records, each record corresponding to a respective one of said allocated node identifiers.

According to a second aspect of the invention, there is provided an apparatus for converting an XML encoded dataset into a minimal set of SQL tables, the apparatus including:

a device for identifying at least one hierarchical structure in the XML encoded dataset; and a device for converting an XML encoded dataset associated with each identified hierarchical structure, the device including:

a device for determining a node element set for the identified hierarchical structure of the XML encoded dataset, wherein each node element in the node element set is a discrete level of the identified hierarchical structure of the dataset;

a device for determining one or more nodes of the XML encoded dataset, each node being an instance of a node element;

a device for allocating to each node a unique node identifier; and a device for generating an SQL node table containing one or more records, each record corresponding to a respective one of the allocated node identifiers According to another aspect of the invention there is provided a computer program product including a computer readable medium having recorded thereon a computer program for implementing the method described above.

BRIEF DESCRIPTION OF THE DRAWINGS

One or more embodiments of the present invention are described hereinafter with reference to the drawings, in which;

FIG. 1 shows a sample XML document fragment;

FIG. 2 shows a corresponding SQL node table for the XML fragment of FIG. 1;

FIG. 3 shows a corresponding SQL content table for the XML fragment of FIG. 1;

FIG. 4 shows a corresponding SQL ancestry table for the XML fragment of FIG. 1;

FIG. 5 shows a corresponding SQL table of complex properties for the XML fragment of FIG. 1.

DETAILED DESCRIPTION

Figure 6:
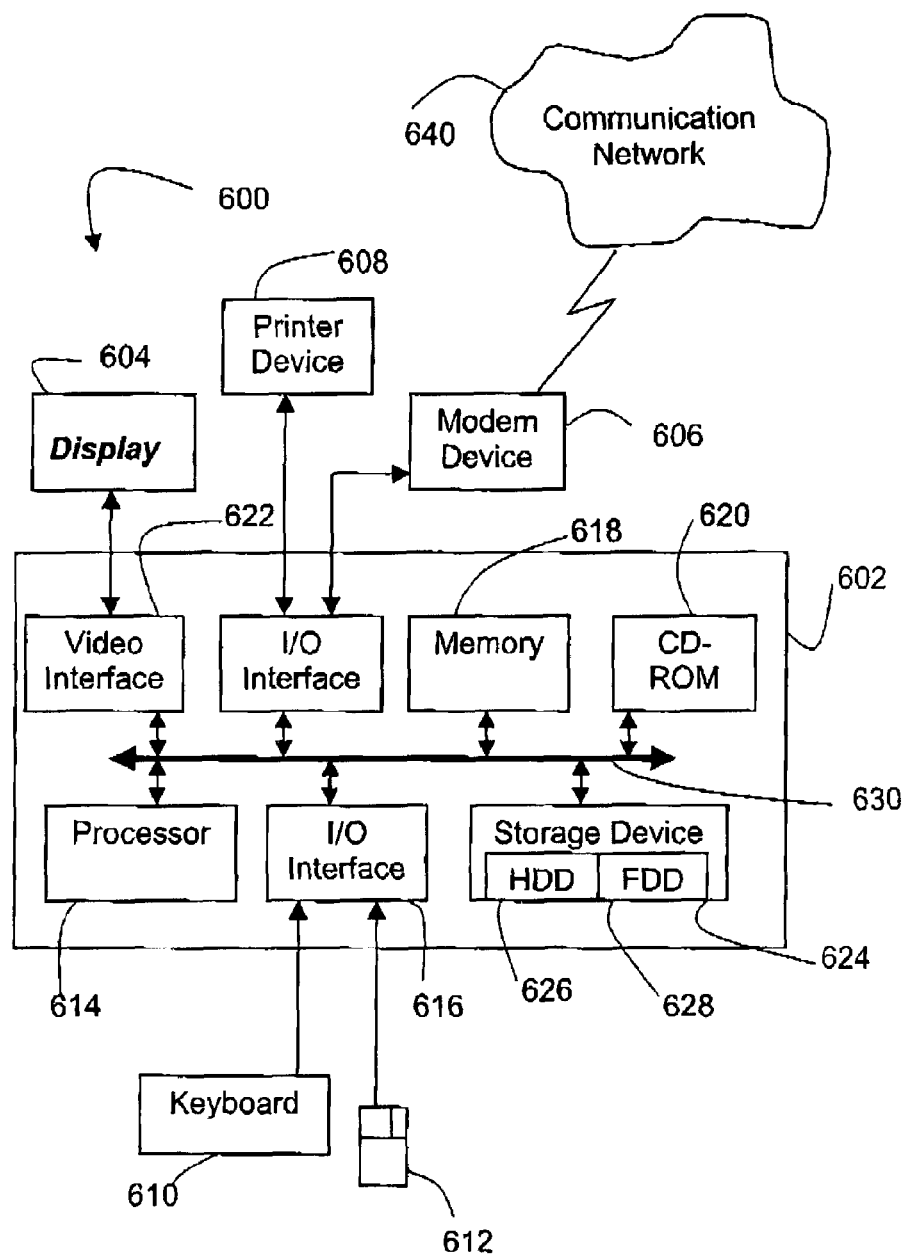
FIG. 6 is a schematic block diagram representation of a general-purpose computer system on which a method for converting XML data into SQL tables may be practised.

A method, an apparatus and a computer program product for converting an XML document into a set of SQL tables are described. In the following description, numerous details are set forth. It will be apparent to one skilled in the art, however, that the present invention may be practised without these specific details. In other instances, well-known features are not described in detail so as not to obscure the present invention.

Where reference is made in any one or more of the accompanying drawings to steps and/or features, which have the same reference numerals, those steps and/or features have for the purposes of this description the same function(s) or operation(s), unless the contrary intention appears.

A method of conversion should preferably produce an SQL rendition of an XML dataset that preserves document order, hierarchy, and other links and relationships which are deemed necessary. The required links and relationships may be all of the links and relationships inherent in the XML data, or only a subset of these required to support a particular application, such as Web publishing. Such a method of conversion should also limit the number of tables and records, and the amount of real time processing required by downstream applications, to the minimum consistent with the required functionality.

In the embodiments of the invention, the granularity of the conversion of an XML document to an SQL table is matched to the requirements of those applications that access the SQL output. To this end, the large scale structure of the data is mapped into a set of nodes and properties. Structure below this level is simply pre-processed into a form suitable for direct use by end applications, including:

the back end of a Web site, for online publication of the data; and an XML editor, for ongoing maintenance of the data, in which case there may be no pre-processing apart from dividing the data into appropriate segments, one segment being the marked-up content of one node.

The actual pre-processing that is performed is dependent upon the accessing application. If an accessing application performs all the processing, such as may occur with an XML editor, no pre-processing is required. Alternatively, the data may be rendered into HTML or XHTML for web publishing or the data may be converted into MS Word for word processing. The data may even be converted into multiple formats: XML, XHTML, Word, Adobe Acrobat, Postscript for printing etc.

The conversion process consists of determining all hierarchical structures present in the dataset under consideration, and for each identified hierarchical structure the following steps are performed:

1. Ascertain the optimal node element set;
2. Assign a unique ID to each node;
3. Convert content, dependent upon an accessing application;
4. Construct node, block content, and ancestry tables; and
5. Create complex property tables where required.

The fundamental underlying principle of the conversion strategy, and what sets the strategy apart from other XML to SQL conversion systems, is the concept of operating at a node level, rather than operating on a base element level of the dataset to be converted. A node is a distinguished structural unit of the dataset. A dataset is a set of data possessing complex structure that may be rendered in a number of various formats. Such formats may include an XML document or SQL tables. A node is a discrete unit of data, within which an internal structure may be pre-processed to maximize performance of downstream applications. Typically, a node is introduced by one of a set of specified XML tags (the node element set).

A node may be associated with a predefined portion described in the aforementioned MALT system. Dividing a dataset into a number of nodes removes the need for downstream applications to assemble the required data (usually a node) from various elements. The conversion of data to an appropriate format, such as XHTML or HTML for web applications, means the webserver (if that is the downstream application) does not need to convert the XML data for browser clients that cannot accept XML directly or where the publisher decides not to provide a browser (even if it is XML capable) with XML data for security reasons. Such a situation may result as XML data may incorporate more features than HTML and a publisher may not want a customer to be able to recreate the XML dataset.

The levels within the structure of the information that are regarded as functionally significant by the creators and end users of the dataset must be identified. Inspection of the example indicates that:

{chapter, part, section} is a likely candidate for a node element set. In general, the node tags are preferably supplied to the conversion software, but a (possibly sub-optimal) node element set can be generated automatically. The lowest level of the hierarchy that is selected in the node element set is known as a terminal node element. The remaining nodes are referred to as non-terminal (or higher level) nodes.

The selection of a suitable terminal node element is significant, as documented in the International Publication No. WO 98/34179 (PCT/AU98/00050) and U.S. Pat. No. 6,233,592 pertaining to the MALT system. A good rule of thumb is to take the element that is most often cited by users when referring to a single atom of information within the dataset. In the example of legislation, the most often cited element is usually a section. For multiple document types in a single dataset, the definition of nodes may be more or less complex, depending on the degree to which the document types are comparable.

A principal determinant of the complexity of the nodes is the record structure adopted for each record associated with a predefined portion. For example, consider a dataset consisting of multiple document type definitions (DTDs) for legislation: a first DTD for old style textual legislation and a second DTD for new style legislation that incorporates examples and graphics. The document types are sufficiently similar to allow the application of a common node element set, for example {chapter, part, section}. A further example is a dataset consisting of multiple DTDs for case law: a first DTD for reports and a second DTD for practice notes. The documents need only be sufficiently similar to allow the application of the same node element set and conversion strategy for all documents in the dataset. In the case law example, a suitable node element set might be {jurisdiction, year, court, casereport, pracnote, judgment}. The common elements shared by the different document types enable a relatively simple definition of node elements to be applied to disparate sets of data. In such situations, the definition of nodes may not be too complex as the document types share common features. A principal determinant is the choice of a terminal node element. The levels of the hierarchy that constitute the remainder of the node element set are also associated with predefined portions. Thus, there may be multiple predefined portions in a single XML dataset, When dealing with multiple predefined portions in a single dataset, each terminal portion is duplicated when it changes in any degree. Non-terminal (higher level) portions typically contain no variable content except for a title, any other variable content being delegated to terminal sub-portions. While the title itself may be regarded as a degenerate sub-portion, it is usually more efficient to add special handling of titles to the conversion process (e.g. by reserving a separate table for title fields).

With no variable content, and title changes handled separately, the only substantive change which can apply to a non-terminal portion (apart from creation and deletion) is a structural change. For example, a legislative part may be converted into a chapter, or moved from one chapter to another. In this case the entire portion, including all contained sub-portions, must be duplicated at the new location in the hierarchy.

One table of nodes may possibly be used for two or more document types in the following circumstances:

(a) if the terminal nodes in each document type can be regarded as functionally equivalent, regardless of whether the element names are identical and regardless of the terminal nodes' respective positions in the hierarchy of the document type; and (b) if the record structure for each node is equivalent (e.g. each node, however named, has an ID, dates when the node was applicable, a label and title). An example is Commonwealth Acts and Commonwealth Regulations, where the node can be for both sections of Acts and regulations of Regulations.

In certain cases, multiple document types may preferably, or even desirably, be represented in multiple node tables. Such situations might include:

where the production cycle of each document type cannot be sufficiently synchronized to permit the simultaneous output of all nodes from all document types; or where end users typically access material from different document types using different methods for each, An example is Commonwealth Acts and Commonwealth case law (judgments).

If, for example, legislation and case law are incorporated in a single dataset, there may be two different hierarchical structures. It may be preferable, or even necessary, to define a node element set and a corresponding node table for each of the hierarchical structures involved.

Each node consists of the following components:
node ID,
properties (order independent metadata represented by specified attributes or sub-elements);
sub-nodes (subordinate nodes);
initial content (any non-property content prior to the first sub-node); and
block content (content after the first sub-node).

A node ID is a value that uniquely identifies a node and specifies the node's position in a dataset. A property is a descriptive attribute of a node that may be derived (in XML) from a node tag (name or attributes) or nominated sub-elements. A simple property is a property that can take at most one value per node. A complex property is a property that may have multiple values for the same node, A sub-node is a node that forms part of the content of an enclosing node. A terminal node is a node that cannot contain sub-nodes. A node element set is the set of XML elements that introduce a new node. Content is defined to be the information associated with a node other than the node's properties. Initial content is the content of a node prior to any sub-nodes. Block content is the content of a node between sub-nodes or after the last sub-node.

An optimal node definition produces a set of nodes with comparable internal structure, For example, the nodes defined for FIG. 1 all have a label property. The nodes are desirably defined so that the number of non-initial content blocks is kept to a minimum.

The dataset in the example of FIG. 1 has only one content block, namely the note at the end of Part A. While belonging to the part, the note follows sections 56 and 56A, which are (sub-)nodes in their own right. The note in section 56 is not a content block, because the note is not preceded by a sub-node. Rather, the note forms part of the initial content of that section.

Once a node set is established, each data node (and non-initial content block) is assigned an arbitrary node ID. This ID is typically an integer with the following properties:

each node or content block has exactly one, unique ID; and a node (or block) with a lower ID always precedes a node with a higher ID in document order.

The node IDs need not form an unbroken sequence. It is sufficient that the node IDs be unique and reflect document order. When SQL conversion is complete, the node ID can act as a unique key to each node and content block. Initial content always inherits the ID of the initial content's containing node, and so does not require a separate ID.

Simple properties are those which can take at most one value per node. These properties can be derived from three sources:

the name of the node element (see the level property in the example);

the attributes of the node element (the shortref property); and the attributes or content of a unique sub-element (the label property).

To maximize performance of the resulting SQL dataset, all XML data except node tags and properties are converted into content fields. These content fields are typically text strings and may be marked in XML, HTML, or any other format required by the end application. Because content (which usually comprises the overwhelming bulk of the dataset) is pre-processed once, only operations relating to nodes as a whole need to be performed "on the fly".

Thus, in the example, all of the <p> paragraph and <note> elements (and any internal markup) are pre-processed into content blocks, and so do not have to be dealt with in real time. Note that initial content and other block content undergoes identical conversion, but must be appropriately flagged in the content SQL table (see below).

For each document type, or group of equivalent document types, a corresponding node table has one record per node, and the following fields:

node_id—the unique node ID assigned to the current node; and one field for each simple property of the current node (e.g. label in the example).

FIG. 2 illustrates a node table corresponding to the FIG. 1 dataset. Each node has a corresponding record in the node table 200. Each record in the node table 20 contains a first field 22 for the node_id, a second field 24 designating the type of node element, designated "level", a third field 26 for a label and a fourth field 28 for a short reference, designated "shortref". In the example, Chapter 3 is defined to be a node of level "chapter" having a node_id 300, a label "3" and a shortref "Ch 3". Similarly, Section 56 is defined to be a node of level "section" having a node_id 311, a label "56" and a shortref "s 56".

The minimum number of SQL tables required to represent an XML encoded dataset is one. However, utilising a single table would require a large number of columns, many of which would be sparsely populated. It is known that relational databases perform sub-optimally in such situations. Accordingly, it is preferable to convert an XML dataset into a single SQL node table and a minimum set of ancillary SQL tables. Presenting the data in multiple tables allows the data to be accessed in multiple ways, often resulting in improved performance. Presenting the data in a minimum set of compact tables simplifies the management of the data. A single, sparsely populated table can be unwieldy and cumbersome. For this reason, an exemplary embodiment typically utilises content and ancestry tables.

Converting each element in a dataset to a corresponding table (as it is currently done by IBM, Oracle, Microsoft and Sybase) results in an overly complex product, The pre-processed content (both initial and block) is stored in a content table with the following fields:

node_id—the ID of the containing node;

block_id—the ID of the content block (or 0 for initial content); and content—the pre-converted content string.

A content block inherits properties from the containing node. FIG. 3 illustrates a content table 30 corresponding to the FIG. 1 dataset. Each record in the content table 30 contains a node_id field 32 that allows the content table 30 to be correlated with the node table 20. Each record in the content table 30 also contains a block_id field 34 and a content field 36. It can be seen from the content table 30 that the Chapter 3 node, having a node_id of 300, also has a block_id of 0 and a content field "chapter 3 intro".

A node may have more than one associated record in the content table 30. For example, node_id 310 is associated with Part A of the legislation XML fragment of FIG. 1. There are two records in the content table 30 having a node_id of 310. The first record indicates that the node_id 310 has a first associated block_id 0 with content "part A intro", The second record indicates that node_id 310 contains a second associated block_id 313 with content "note at end of part A".

The node IDs specify document order, but do not preserve the document hierarchy. This function is performed by the ancestry table. While in theory only parent information need be saved, it is usually more efficient to explicitly generate all ancestry relationships (including self). In this manner, SQL queries that drive data retrieval are simpler and more efficient. There are only two fields in the ancestry table:

desc_id—the node ID of a descendant node; and anc_id—the node ID of an ancestor node.

FIG. 4 illustrates an ancestry table 40 corresponding to the FIG. 1 dataset. Each record in the ancestry table 40 contains a desc_id field 42 and an anc_id field 44. The first record in the ancestry table 40 contains a desc_id field containing node_id 300 and an anc_id field containing node_id 300. This record defines the ancestral relationship that node_id 300 has with itself The second record in the ancestry table 40 contains a desc_id field containing node_id 310 and an anc_id field containing node_id 300. Thus, the second record indicates that node_id 310 is a descendant of node_id 300. The ancestry table 40 preserves the hierarchical structure of the XML fragment from FIG. 1 using SQL tables.

While simple properties can be stored in the node table, complex properties have to be handled separately. Complex properties can occur more than once per node (e.g. a set of see also links), and can possess sub-properties (e.g. a set of chapter titles which have corresponding start and end dates). There is typically one table per complex property with the following fields:

node_id—the unique ID of the node to which the property applies;

value—the value of the property; and other fields if required for sub-properties.

FIG. 5 illustrates how dated higher level titles can be set up as a SQL table. FIG. 5 shows a complex property table 50. A node_id field 52 allows records in the complex property table 50 to be reconciled with entries in the node table 20 of FIG. 2. Each record in the complex property table 50 contains a start_date field 54, an end_date field 56 and a value field 58. The first record has a node_id of 300, which corresponds to Chapter 3 from the legislation XML fragment of FIG. 1. The first record of the complex property table 50 indicates that a value "Directors' Responsibilities" is associated with node_id 300 and has a start_date of 1996-07-15. The absence of a corresponding end_date indicates that the value is currently applicable.

While the conversion can be driven entirely automatically, the best results are achieved when the mapping is matched to the needs of specific applications. To this end, the user can supply the following:
  the node element set;
  simple properties (derived from element names, attributes or content);
  complex properties and sub-properties; and
  content conversion algorithm.

The above information is quite simple to produce and sufficient to drive the mapping process to completion.

A strategy and software, to be known as "MALTmap", have been described for converting arbitrary XML data into SQL tables. Unlike conventional tree mapping techniques, MALTmap is designed to produce an optimal SQL table set with a minimum of tables and records. In this way, the performance and management benefits of using SQL are maximized.

The method of converting XML data into SQL tables is preferably practised using a general-purpose computer system 600, such as that shown in FIG. 6 wherein the processes described above with respect to FIGS. 2 to 5 may be implemented as software, such as an application program executing within the computer system 600. In particular, the steps of a method of converting XML data into SQL tables are effected by instructions in the software that are carried out by the computer. The instructions may be formed as one or more code modules, each for performing one or more particular tasks. The software may also be divided into two separate parts, in which a first part performs the processes described above with respect to FIGS. 2 to 5 and a second part manages a user interface between the first part and the user. The software may be stored in a computer readable medium, including the storage devices described below, for example. The software is loaded into the computer from the computer readable medium, and then executed by the computer. A computer readable medium having such software or computer program recorded on it is a computer program product. The use of the computer program product in the computer preferably effects an advantageous apparatus for the processes described above with respect to FIGS. 2 to 5.

The computer system 600 comprises a computer module 602, input devices such as a keyboard 610 and mouse 612, output devices including a printer 608 and a display device 604. A Modulator-Demodulator (Modem) transceiver device 606 is used by the computer module 602 for communicating to and from a communications network 640, for example connectable via a telephone line or other functional medium. The modem 606 can be used to obtain access to the Internet, and other network systems, such as a Local Area Network (LAN) or a Wide Area Network (WAN).

The computer module 602 typically includes at least one processor unit 614, a memory unit 618, for example formed from semiconductor random access memory (RAM) and read only memory (ROM), input/output (I/O) interfaces including a video interface 622, and an I/O interface 616 for the keyboard 610 and mouse 612 and optionally a joystick (not illustrated), and an I/O interface for the modem 606. A storage device 624 is provided and typically includes a hard disk drive 626 and a floppy disk drive 628. A magnetic tape drive (not illustrated) may also be used. A CD-ROM drive 620 is typically provided as a non-volatile source of data. The components 614 to 628 of the computer module 602 typically communicate via an interconnected bus 630 and in a manner which results in a conventional mode of operation of the computer system 600 known to those in the relevant art. Examples of computers on which the described arrangements can be practiced include IBM-PC's and compatibles, Sun Sparcstations or alike computer systems evolved therefrom.

Typically, the application program is resident on the hard disk drive 610 626 and read and controlled in its execution by the processor 605 614. Intermediate storage of the program and any data fetched from the network 620 640 may be accomplished using the semiconductor memory 606 618, possibly in concert with the hard disk drive 610 626. In some instances, the application program may be supplied to the user encoded on a CD-ROM or floppy disk and read via the corresponding drive 612 620 or 611 628, or alternatively may be read by the user from the network 620 640 via the modem device 616 606. Still further, the software can also be loaded into the computer system 600 from other computer readable media. The term "computer readable medium" as used herein refers to any storage or transmission medium that participates in providing instructions and/or data to the computer system 600 for execution and/or processing. Examples of storage media include floppy disks, magnetic tape, CD-ROM, a hard disk drive, a ROM or integrated circuit, a magneto-optical disk, or a computer readable card such as a PCMCIA card and the like, whether or not such devices are internal or external of the computer module 601. Examples of transmission media include radio or infra-red transmission channels as well as a network connection to another computer or networked device, and the Internet or Intranets including email transmissions and information recorded on websites and the like.

The method of converting XML data into SQL tables may alternatively be implemented in dedicated hardware such as one or more integrated circuits performing the processes or sub-processes described above with reference to FIGS. 2 to 5. Such dedicated hardware may include one or more microprocessors and associated memories.

INDUSTRIAL APPLICABILITY

It is apparent from the above that the arrangements described are applicable to any industry that has a need for XML encoded text-based data. Examples are the electronic publishing industry, document management, requirements engineering documents, journal articles, manuals, software and other online help.

The foregoing describes only some embodiments of the present invention, and modifications and/or changes can be made thereto without departing from the scope and spirit of the invention, the embodiments being illustrative and not restrictive.

We claim:

1. A computer implemented method for converting an XML encoded dataset into a set of SQL tables and storing said XML encoded dataset in said set of tables, said method comprising:
  identifying at least one hierarchical structure in said XML encoded dataset; and
  converting an XML encoded dataset associated with each identified hierarchical structure,
  wherein for each identified hierarchical structure said converting step comprises the further steps of:

determining a node element set for said identified hierarchical structure of said XML encoded dataset, wherein each node element in said node element set is a discrete level of said identified hierarchical structure of said dataset, said discrete level having an internal structure containing either element content or element content and data content;

determining one or more nodes of said XML encoded dataset, each node being an instance of a node element;

allocating to each said instance of a node element a unique node identifier; and generating and storing said set of SQL tables, said set of SQL tables containing one or more records, each record corresponding to a respective one of said allocated node identifiers;

wherein said node elements are selected to eliminate the need for downstream applications to assemble data from an elemental level, and wherein said set of SQL tables are limited to a number of tables required by said downstream applications.

2. The method according to claim 1 wherein said XML encoded dataset comprises a plurality of predefined portions of text-based data, each predefined portion of said text-based data being encoded using XML, and a plurality of attributes for organizing said predefined portions of said text-based data.

3. The method according to claim 2, wherein said predefined portions comprise at least one modified and stored predefined portion encoded using XML, said attributes for organizing said predefined portions and said modified predefined portion of said text-based data.

4. The method according to claim 3, wherein said XML encoded dataset further comprises a plurality of linking means of a markup language, each predefined portion of said text-based data and said at least one modified predefined portion of text-based data being encoded with at least one linking means.

5. The method according to claim 1, wherein for each identified hierarchical structure, said converting step further comprises the step of generating a node table with one record for each said node, each said record of said node table including a field containing the value of said unique node identifier allocated to said node.

6. The method according to claim 5, wherein each record of said node table further comprises a field for each simple property of the corresponding node, a simple property being capable of taking at most one value per node.

7. The method according to claim 1, wherein each node comprises at least one of a property, sub-node, initial content, and block content.

8. The method according to claim 1 comprising the further step of: converting the XML encoded dataset into pre-processed content fields.

9. The method according to claim 8, wherein for each identified hierarchical structure, said converting step comprises the further step of:

generating a content table with said pre-processed content fields in said content table, each record in said content table having a node identifier field containing the corresponding node identifier, a block identifier field and a content field containing said pre-processed content field.

10. The method according to claim 1, wherein for each identified hierarchical structure, said converting step comprises the further step of: generating an ancestry table with node identifiers defining the inter-relationships among nodes of said identified hierarchical structure of said XML encoded dataset.

11. The method according to claim 10, wherein said ancestry table comprises a descendant node identifier field and an ancestor node identifier field.

12. The method according to claim 1 comprising the further step of: generating an SQL complex properties table having a node identifier field and a value field.

13. The method according to claim 12, wherein said complex properties table further comprises a sub-property field.

14. An apparatus for converting an XML encoded dataset into a set of SQL tables and storing said XML encoded dataset in said set of tables, said apparatus comprising:

a processor for identifying at least one hierarchical structure in said XML encoded dataset; and a converter for converting an XML encoded dataset associated with each identified hierarchical structure, said converter comprising:

a processor for determining a node element set for said identified hierarchical structure of said XML encoded dataset, wherein each node element in said node element set is a discrete level of said identified hierarchical structure of said dataset, said discrete level having an internal structure containing either element content or element content and data content;

a processor for determining one or more nodes of said XML encoded dataset, each node being an instance of a node element;

an allocater for allocating to each said instance of a node element a unique node identifier; and a generator for generating and storing said set of SQL tables, said set of SQL tables containing one or more records, each record corresponding to a respective one of said allocated node identifiers;

wherein said node elements are selected to eliminate the need for downstream applications to assemble data from an elemental level, and wherein said set of SQL tables are limited to a number of tables required by said downstream applications.

15. The apparatus according to claim 14, wherein said XML encoded dataset comprises a plurality of predefined portions of text-based data, each predefined portion of said text-based data being encoded using XML, and a plurality of attributes for organizing said predefined portions of said text-based data.

16. The apparatus according to claim 15, wherein said predefined portions comprise at least one modified and stored predefined portion encoded using XML, said attributes for organizing said predefined portions and said modified predefined portion of said text-based data.

17. The apparatus according to claim 16, wherein said XML encoded dataset further comprises a plurality of linking means of a markup language, each predefined portion of said text-based data and said at least one modified predefined portion of text-based data being encoded with at least one linking means.

18. The apparatus according to claim 14, wherein for each identified hierarchical structure, said converter for converting further comprises a generator for generating a node table with one record for each said node, each said record of said node table including a field containing the value of said unique node identifier allocated to said node.

19. The apparatus according to claim 18, wherein each record of said node table further comprises a field for each simple property of the corresponding node, a simple property being capable of taking at most one value per node.

20. The apparatus according to claim 14, wherein each node comprises at least one of a property, sub-node, initial content, and block content.

21. The apparatus according to claim 14 further comprising: a converter for converting the XML encoded dataset into pre-processed content fields.

22. The apparatus according to claim 21, wherein said means for converting an XML encoded dataset associated with each identified hierarchical structure further comprises: a generator for generating a content table with said pre-processed content fields in said content table, each record in said content table having a node identifier field containing the corresponding node identifier, a block identifier field and a content field containing said pre-processed content field.

23. The apparatus according to claim 14, wherein said converter for converting an XML encoded dataset associated with each identified hierarchical structure further comprises: a generator for generating an ancestry table with node identifiers defining the inter-relationships among nodes of said identified hierarchical structure of said XML encoded dataset.

24. The apparatus according to claim 23, wherein said ancestry table comprises a descendant node identifier field and an ancestor node identifier field.

25. The apparatus according to claim 14 further comprising: a generator for generating an SQL complex properties table having a node identifier field and a value field.

26. The apparatus according to claim 25, wherein said complex properties table further comprises a sub-property field.

27. A computer program product having a computer readable storage medium having a computer program recorded therein for converting an XML encoded dataset into a set of SQL tables and storing said XML encoded dataset in said set of tables, said computer program product comprising:
  computer program code means for identifying at least one hierarchical structure in said XML encoded dataset;
  computer program code means for converting an XML dataset associated with each identified hierarchical structure, said means comprising:
    computer program code means for determining a node element set for said identified hierarchical structure of said XML encoded dataset, wherein each node element in said node element set is a discrete level of said identified hierarchical structure of said dataset, said discrete level having an internal structure containing either element content or element content and data content;
    computer program code means for determining one or more nodes of said XML encoded dataset, each node being an instance of a node element;
    computer program code means for allocating to each said instance of a node element a unique node identifier, and
    program code means for generating and storing said set of SQL tables, said set of SQL tables containing one or more records, each record corresponding to a respective one of said allocated node identifiers;
  wherein said node elements are selected to eliminate the need for downstream applications to assemble data from an elemental level, and
  wherein said set of SQL tables are limited to a number of tables required by said downstream applications.

28. The computer program product according to claim 27, wherein said XML encoded dataset comprises a plurality of predefined portions of text-based data, each predefined portion of said text-based data being encoded using XML, and a plurality of attributes for organizing said predefined portions of said text-based data.

29. The computer program product according to claim 28, wherein said predefined portions comprise at least one modified and stored predefined portion encoded using XML, said attributes for organizing said predefined portions and said modified predefined portion of said text-based data.

30. The computer program product according to claim 29, wherein said XML encoded dataset further comprises a plurality of linking means of a markup language, each predefined portion of said text-based data and said at least one modified predefined portion of text-based data being encoded with at least one linking means.

31. The computer program product according to claim 27, wherein for each identified hierarchical structure, said computer program code means for converting further comprises computer program code means for generating a node table with one record for each said node, each said record of said node table including a field containing the value of said unique node identifier allocated to said node.

32. The computer program product according to claim 31, wherein each record of said node table further comprises a field for each simple property of the corresponding node, a simple property being capable of taking at most one value per node.

33. The computer program product according to claim 27, wherein each node comprises at least one of a property, sub-node, initial content, and block content.

34. The computer program product according to claim 27 further comprising: computer program code means for converting the XML encoded dataset into pre-processed content fields.

35. The computer program product according to claim 34, wherein said computer program code means for converting an XML dataset associated with each identified hierarchical structure further comprises: computer program code means for generating a content table with said pre-processed content fields in said content table, each record in said content table having a node identifier field containing the corresponding node identifier, a block identifier field and a content field containing said pre-processed content field.

36. The computer program product according to claim 27, wherein said computer program code means for converting an XML dataset associated with each identified hierarchical structure further comprises: computer program code means for generating an ancestry table with node identifiers defining the inter-relationships among nodes of said identified hierarchical structure of said XML encoded dataset.

37. The computer program product according to claim 36, wherein said ancestry table comprises a descendant node identifier field and an ancestor node identifier field.

38. The computer program product according to claim 27 further comprising: computer program code means for generating an SQL complex properties table having a node identifier field and a value field.

39. The computer program product according to claim 38, wherein said complex properties table further comprises a sub-property field.

* * * * *